US011503818B2

(12) United States Patent
Parker (10) Patent No.: US 11,503,818 B2
(45) Date of Patent: Nov. 22, 2022

(54) FARRIER HOOF STAND APPARATUS

(71) Applicant: Roy Parker, Oxford, PA (US)

(72) Inventor: Roy Parker, Oxford, PA (US)

(*) Notice: Subject to any disclaimer, the term of this patent is extended or adjusted under 35 U.S.C. 154(b) by 408 days.

(21) Appl. No.: 16/773,736

(22) Filed: Jan. 27, 2020

(65) Prior Publication Data

US 2020/0267959 A1  Aug. 27, 2020

Related U.S. Application Data (60) Provisional application No. 62/810,876, filed on Feb. 26, 2019.

(51) Int. Cl.
| A01L 11/00 | (2006.01) |
| F16M 11/04 | (2006.01) |
| F16B 1/00 | (2006.01) |

(52) U.S. Cl.
CPC ............ *A01L 11/00* (2013.01); *F16M 11/046* (2013.01); *F16B 1/00* (2013.01); *F16M 2200/028* (2013.01)

(58) Field of Classification Search
CPC .. B66F 3/00; B66F 3/28; F16M 11/26; F16M 11/046; A01L 11/10
USPC .......... 211/17, 20, 22, 23, 24; 248/146, 149, 248/154, 158, 161, 413, 157, 159
See application file for complete search history.

(56) References Cited

U.S. PATENT DOCUMENTS

| 5,396,993 A * | 3/1995 | Spitler ................... A47J 47/16 248/37.3 |
| 8,827,218 B2 * | 9/2014 | Saunders ............ B05B 13/0285 248/176.1 |
| 10,774,951 B2 * | 9/2020 | Ball ........................ F16L 3/127 |
| 11,028,962 B1 * | 6/2021 | Barrow ................ F16M 11/046 |
| 2015/0308612 A1 * | 10/2015 | Chen ...................... F16M 11/22 248/352 |
| 2017/0049091 A1 * | 2/2017 | Fesperman ............. A01L 13/00 |
| 2020/0240575 A1 * | 7/2020 | Lee ....................... F16M 13/022 |
| 2021/0356072 A1 * | 11/2021 | Kliskey .................. F16M 11/28 |

* cited by examiner

Primary Examiner — Alfred J Wujciak (57) ABSTRACT

The instant disclosure relates to a farrier hoof stand apparatus that includes a base, a vertical rise adjuster centrally and orthogonally affixed to the base. A plurality of buttresses are each affixed to the base and vertical rise adjuster ("VRA"). A stall jack is slidably positioned over the VRA opposite the base. A cradle is demountably positioned on the stall jack. A plurality of elongated tool holders are each affixed to the stall jack. A pin fastener is demountably coupled to the VRA and the stall jack. A plurality of magnets are each peripherally affixed to the base. The stall jack includes an anvil, an orifice positioned on the anvil, and a post affixed to the anvil. The post is slidably positioned over the VRA. The base is square and substantially planar. The plurality of elongated tool holders are each angularly affixed to the post opposite each other.

20 Claims, 9 Drawing Sheets

FARRIER HOOF STAND APPARATUS

CROSS-REFERENCE TO RELATED APPLICATIONS

This application claims priority to U.S. Provisional Application No. 62/810,876 filed Feb. 26, 2019, which is hereby incorporated herein by reference.

FIELD OF THE INVENTION

The present disclosure relates generally to equine care tools. More specifically, the present disclosure describes farrier hoof stands.

BACKGROUND OF THE INVENTION

A farrier is a specialist in equine hoof care, including the trimming and balancing of horses' hooves as well as the placement of horseshoes thereon. Farriers use a variety of tools, such as rasps and nippers, to trim and shape an equine's hooves. They also adjust and reshape horseshoes if required. For example, equines generally require trimming every six to eight weeks to maintain the proper balance of the foot and lower limbs. At times, the amount of work to clean up after performing farrier duties can be a difficult project.

BRIEF DESCRIPTION OF THE DRAWINGS

Some of the embodiments will be described in detail, with reference to the following figures, wherein like designations denote like members, wherein.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that situated away from positions.

The present disclosure includes many aspects and features. Moreover, while many aspects and features relate to, and are described in the context of farrier hoof stands, embodiments of the present disclosure are not limited to use only in this context.

To begin, a farrier is a specialist in equine hoof care, including the trimming and balancing of horses' hooves as well as the placement of horseshoes thereon. Farriers use a variety of tools, such as rasps and nippers, to trim and shape an equine's hooves. They also adjust and reshape horseshoes if required. For example, equines generally require trimming every six to eight weeks to maintain the proper balance of the foot and lower limbs. At times, the amount of work to clean up after performing farrier duties can be a difficult project. The instant application seeks to provide farrier hoof stands that can assist farriers when performing their duties, but also assists in the cleanup thereafter, in accordance with certain embodiments.

Figure 1:
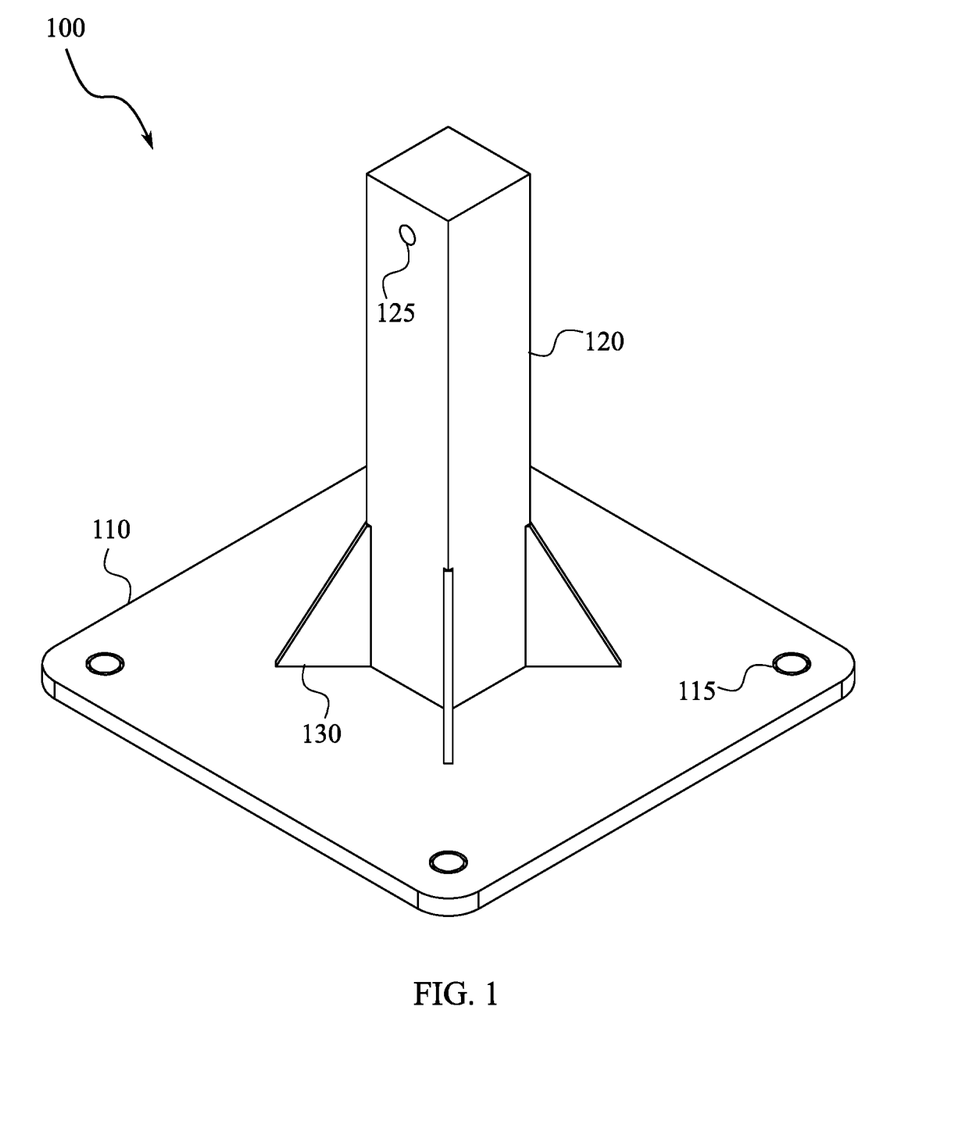
FIG. 1 depicts front perspective view of a first portion of a farrier hoof stand according to some embodiments.
Figure 2:
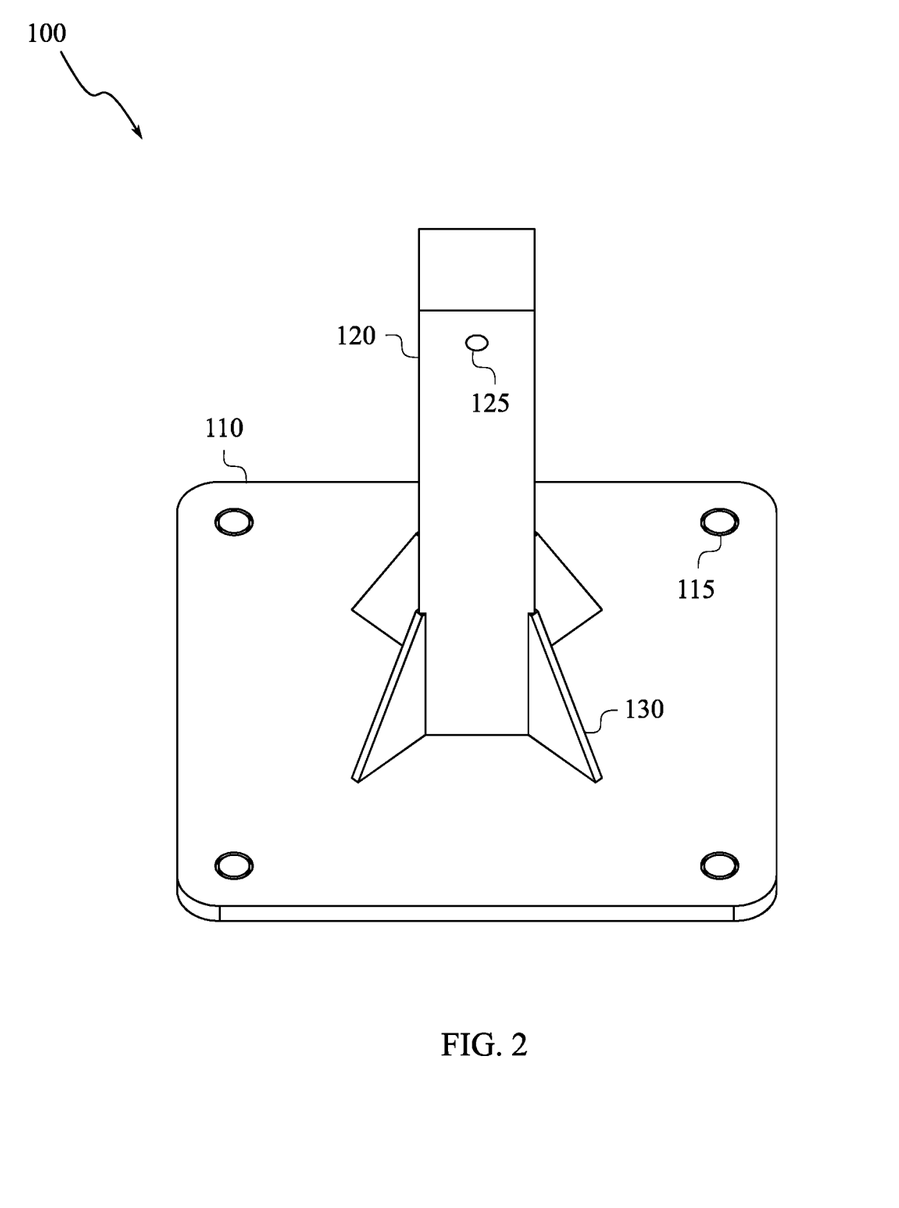
FIG. 2 depicts rear perspective view of the first portion according to other embodiments.

Referring now to the FIGS. FIGS. 1 and 2 depict front and rear perspective views of a first portion, generally 100, respectively, of a farrier hoof stand, generally 800 (discussed below), according to some embodiments. In general, the first portion 100 can be of and/or include therein any shape, size, material, features, type or kind, orientation, location, quantity, components, and arrangements of components that would fulfill the objectives and intents of the instant disclosure. The first portion 100 preferably includes a base 110, a vertical rise adjuster (hereinafter "VRA") 120 centrally and orthogonally affixed to the base 110, and a plurality of buttresses 130 each affixed to the base 110 and the VRA 120. According to preferred embodiments, the base 110, the VRA 120, and the plurality of buttresses 130 are each preferably fabricated using an aluminum material to reduce its overall weight and thereby increase its mobility (e.g., man-portability). In other words, aluminum is the preferred material for components of the first portion 100 to make it easier to maneuver by hand (i.e. increase the man portability of the first portion 100).

The base 110, the VRA 120, and the base 110 can be affixed to each other via welding, in accordance with preferred embodiments. In other embodiments, the first portion 100 can be formed via molding and/or casting. Hoof stands known in the art typically include a round base, which may pose as a hazard to equines if allowed to tip over and roll around. As such, the base 110 is preferably square and substantially planar. For example, the base 110 is a 14×14 inch square. In other embodiments, the base 110 has a substantially planar polygonal shape that reduces its ability to facilitate rolling of the first portion 100 when positioned on its side. At times, the amount of work to clean up after performing farrier duties can be a difficult project. For example, retrieving nails and other small metallic object from floors can be a time consuming, but necessary, task.

Hence, the base 110 preferably includes magnets 115 each peripherally affixed to the base 110. For example, one or more magnets 115 can be affixed to a corner of the base 110.

The VRA 120 is preferably an elongated rectangular structure that is centrally and orthogonally affixed to the base 110. To reduce its overall weight, the VRA 120 is preferably hollow. Here, according to preferred embodiments, each of the plurality of buttresses 130 are orthogonally affixed to the base 110 as well as affixed to a corner of the VRA 120. In other embodiments, each of the plurality of buttresses 130 are orthogonally affixed both the base 110 and to a side of the VRA 120. The VRA 120 preferably includes one or more VRA orifices 125 positioned on two parallel sides of the VRA 120.

Figure 3:
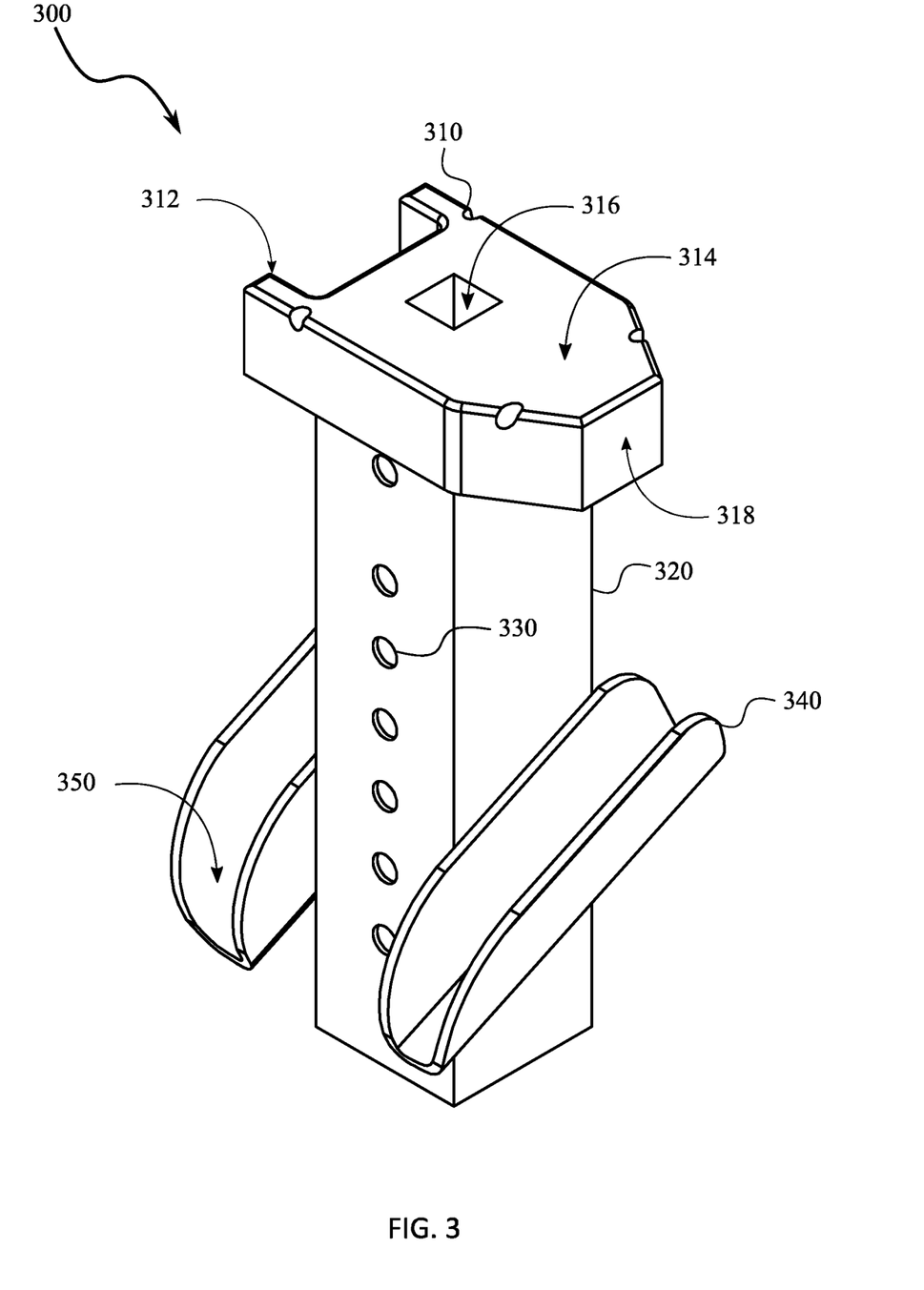
FIG. 3 depicts a front perspective view of a second portion the farrier hoof stand according to certain embodiments.
Figure 4:
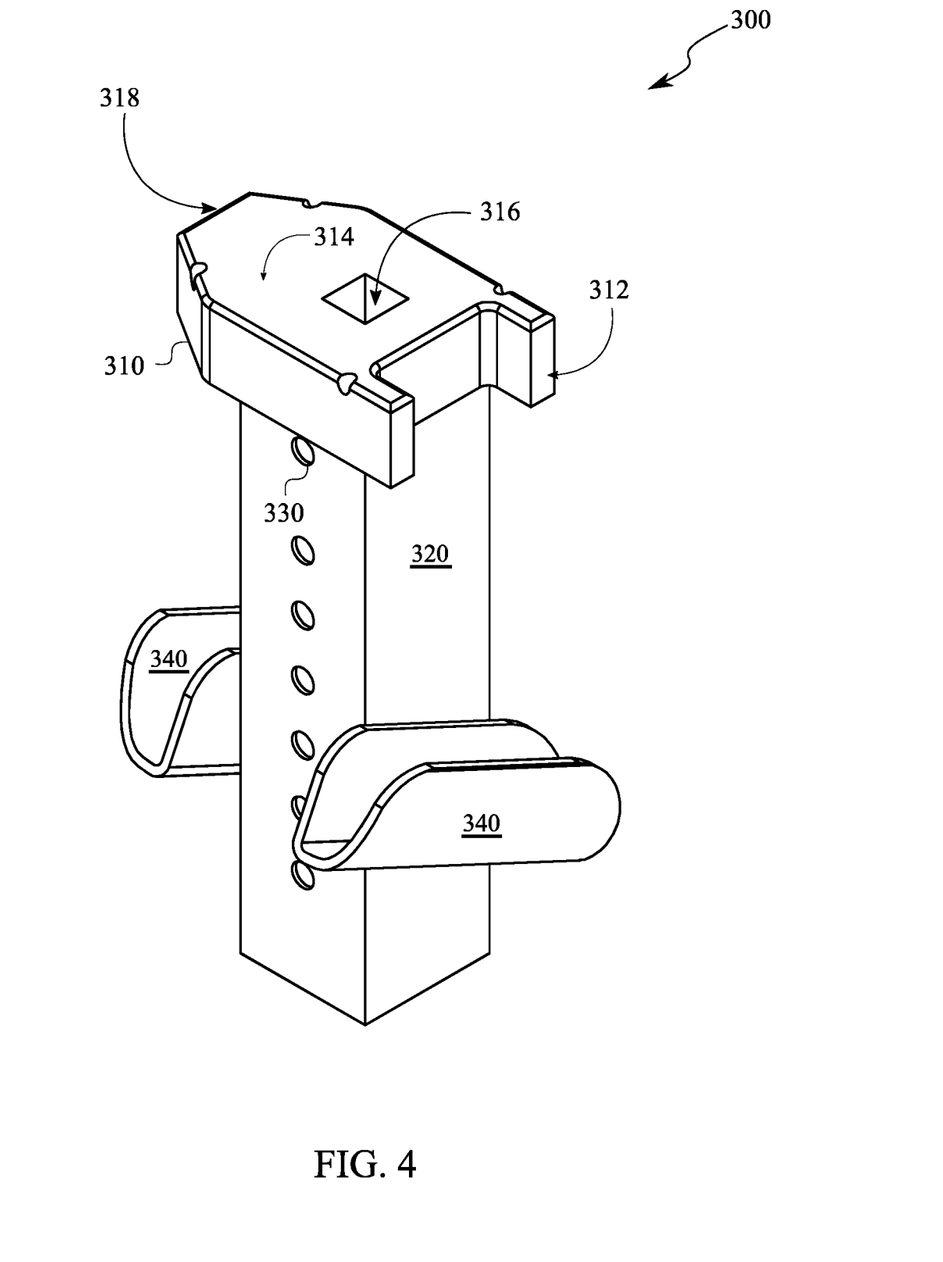
FIG. 4 depicts rear perspective view of the second portion according to yet still other embodiments.
Figure 5:
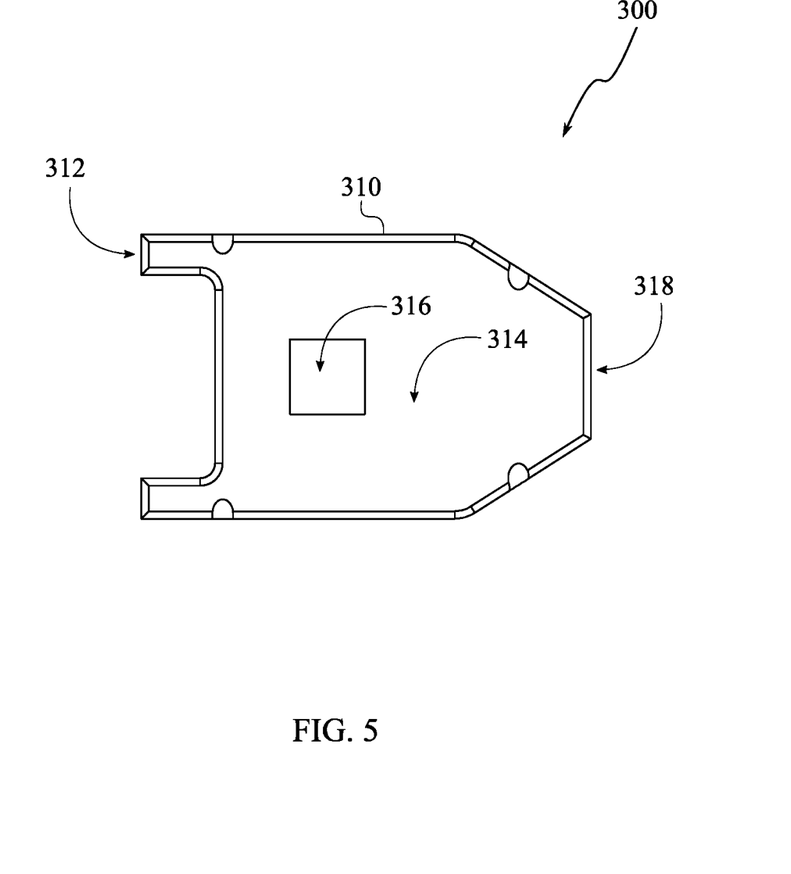
FIG. 5 depicts a top view of the second portion according to some embodiments.

Referring now to FIGS. 3-5, which depict front, rear, and top perspective views of second portion 300, respectively. In general, the second portion 300 can be of and/or include therein any shape, size, material, features, type or kind, orientation, location, quantity, components, and arrangements of components that would fulfill the objectives and intents of the instant disclosure. To be sure, the second portion 300 is a stall jack (e.g., a portable anvil). The second portion 300 is configured to be slidably positioned over the VRA 120 opposite the base 110. In accordance with preferred embodiments, the second portion 300 includes post 320 orthogonally coupled to the anvil 310. The anvil 310 preferably includes cradle orifice 316, which may traverse the height of the anvil 310 or a portion thereof.

The cradle orifice 316 is positioned on face 314 of the anvil 310. In some embodiments, the face 314 is hardened and tempered to resist the blows of the farrier's hammer so that the face 314 does not deform under repeated use. The turning cams 312 each protrude from the anvil 310 coplanarly with the face 314. The turning cams 312 preferably have a circumference or width that helps facilitates the creation of sharp radii of horseshoes as well as fine adjustments to curvatures thereof. A plurality of elongated tool holders 340 are each affixed to the second portion 300 (i.e. the stall jack), in accordance with preferred embodiments. Specifically, the plurality of elongated tool holders 340 are each angularly affixed to the post 320 opposite each other. The plurality of elongated tool holder 340 are preferably fabricated using an aluminum material.

Although each elongated tool holder 340 can have any shape, size, feature, orientation, components, or arrangement of components, each of the plurality of elongated tool holders 340 is preferably an oblong concaved structure with a vertex that extends towards the base 110 when the second portion 300 is slidably positioned over the first portion 100. Each elongated tool holder 340 preferably has a polymer coating 350. The polymer coating 350 includes elastomers (e.g., rubber and similar materials having very weak intermolecular forces, generally low Young's modulus and high failure strain compared with other materials), in accordance with some embodiments. In some embodiments, polymer coatings disclosed in the instant application are preferably an above-grade exterior coating that is approximately 10 times thicker than paint (e.g., paint typically has a viscosity of 100 cps (1 P, 0.1 Pa·s)), which forms an incredibly thick yet flexible coating that helps waterproof the exterior of structure.

Anvils known in the art are typically a heavy steel or iron block with a flat top, concave sides, and typically a pointed end, on which metal can be hammered and shaped. Although any metallic material can be utilized for fabrication, the anvil 310 is preferably made of steel (e.g., cast steel) to enable the energy of striking tools to be transferred to the work piece, in accordance with preferred embodiments. In the instant disclosure, the anvil 310 is preferably a substantially planar polygonal structure having horn 318 oppositely positioned relative to the turning cams 312. Although different shapes can be utilized, the horn 318 is preferably a convexed structure (e.g., a trapezoidal-like structure) that includes angular lateral sides that extend toward a base having a length that is smaller than the width of the anvil 310.

According to preferred embodiments the post 320 made of an aluminum material to reduce its overall weight and thereby increase the mobility of the second portion 300. In other words, aluminum is the preferred material for components of the first portion 100 to make the first portion 100 easier to maneuver by hand. The second portion 300 is slidably positioned over the first portion 100. Specifically, the post 320, which is a hollow rectangular structure, is slidably positioned over the VRA 120. Pin fastener 700 is preferably a fastener (e.g., a clevis pin) having, for example, a plain shaft as well as a chamfered, flat, or rounded end. In some embodiments, to decrease the probability that the fastener may become dislodged, the end of the fastener 700 includes a through hole, spring-loaded ball, wire retainer, retaining ring groove, toggle, locking retainer, wedge, or adjustable length.

Figure 6:
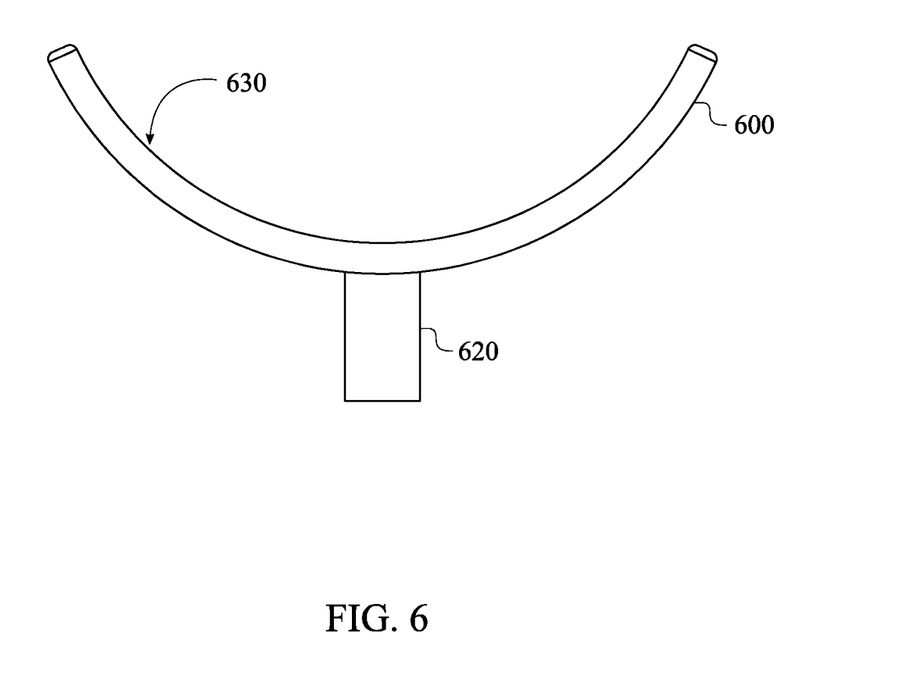
FIG. 6 depicts front view of a cradle according to certain embodiments.
Figure 7:
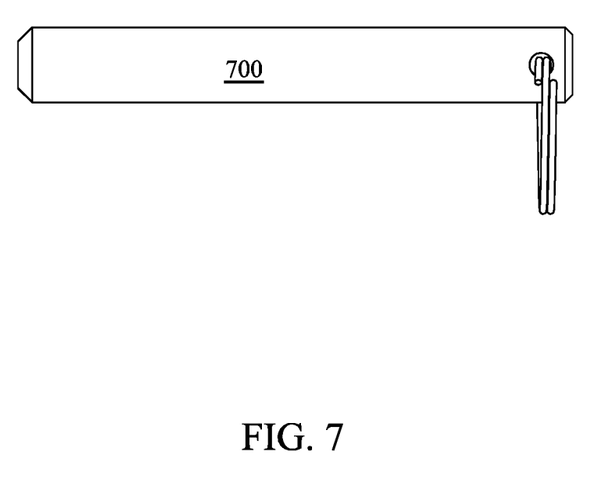
FIG. 7 depicts a front view of a pin fastener according to some embodiments.

The farrier hoof stand 800 preferably includes cradle 600, which is configured to support the hoof for daily maintenance, such as treatment, bandaging, and polishing. In general, the cradle 600 can be of and/or include any shape, size, material, features, orientation, location, components, and arrangement of components that would fulfill the objectives and intents of the instant disclosure. The cradle 600 is preferably demountably positioned on the stall jack (i.e. the second portion 300), which allows the farrier hoof stand 800 to transition between farrier stand with the cradle 600 positioned in the cradle orifice 316 and stall jack with the cradle 600 removed therefrom. Specifically, the cradle 600 includes a cradle post 620 and a U-shaped structure 610, wherein the cradle post 620 is medianly positioned on the U-shaped structure 610. The cradle post 620 is demountably positioned within the cradle orifice 316.

Referring now to FIGS. 6-9. The cradle 600 is configured to have direct contact with the equine during use. Although the cradle 600 is made of a metal (e.g., steel, aluminum, and similar metals), the cradle 600 preferably includes a polymer coating 630 (e.g., an elastomer) for equine comfort. For example, the polymer coating 630 can include rubber (e.g., natural or synthetic) and similar elastomers. The cradle 600 is preferably made of aluminum to reduce its overall weight and increase the man-portability (i.e. the ability of an object to be transported on a person) of the farrier hoof stand 800.

Figure 8:
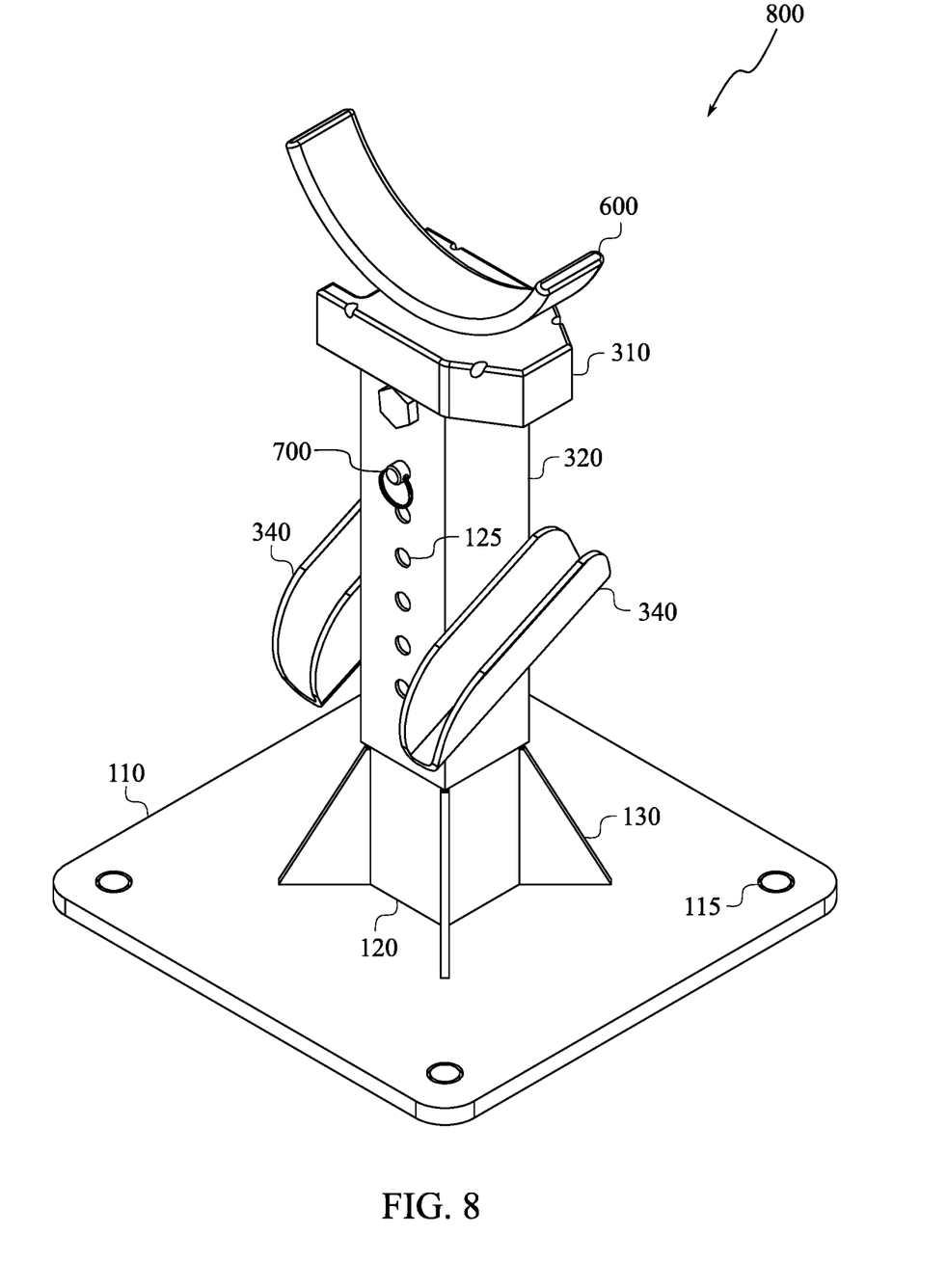
FIG. 8 depicts a perspective view the farrier hoof stand in a "first" position according to other embodiments.
Figure 9:
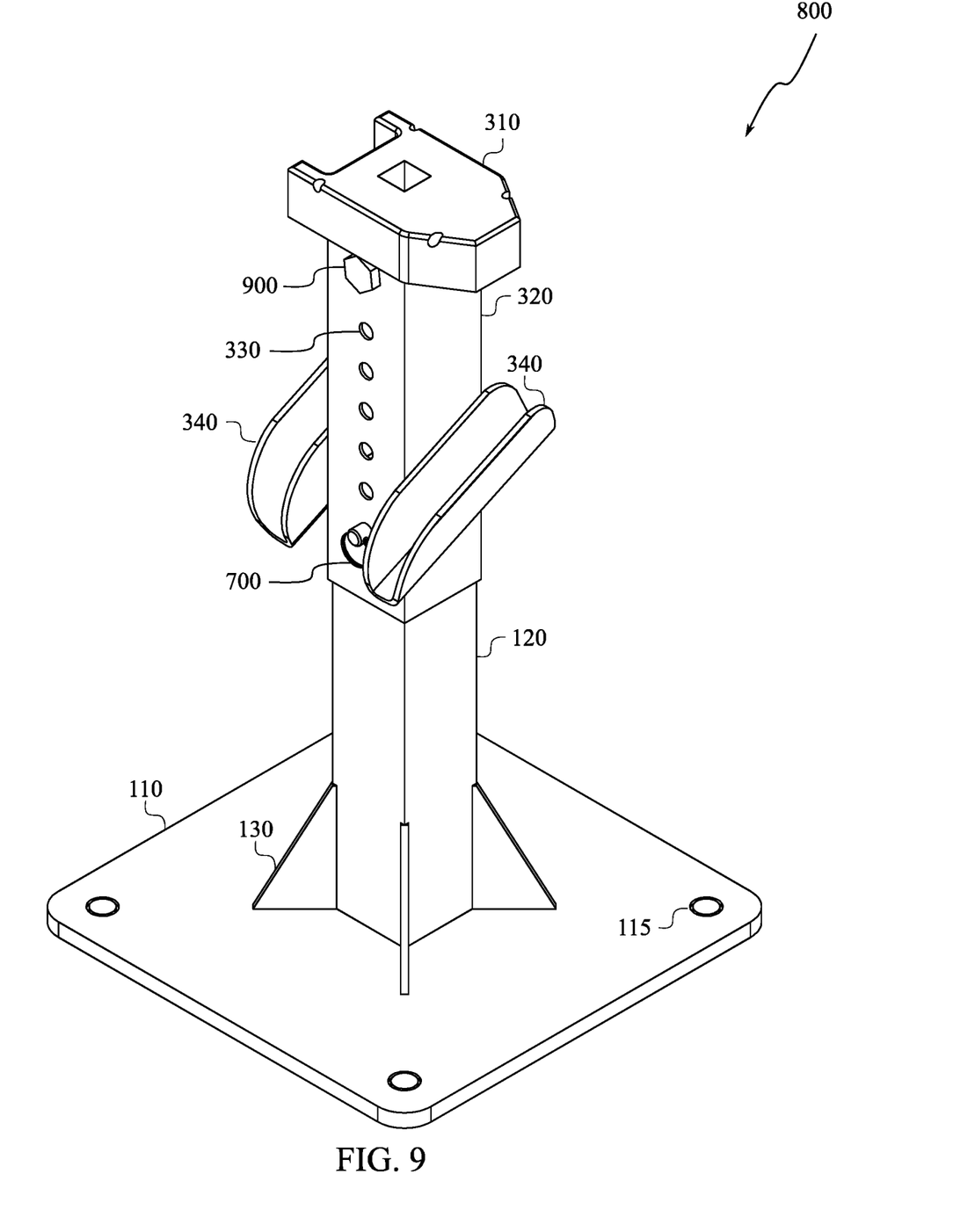
FIG. 9 depicts a front perspective view of the farrier hoof stand in a "second" position according to yet still other embodiments.

FIGS. 8 and 9 depict the farrier hoof stand 800 in its "first" and "second" positions, respectively, according to certain embodiments. To be sure, the farrier hoof stand 800 is preferably configured to assume a variety of heights to accommodate farriers and/or equines of different heights. For example, the farrier hoof stand 800 can assume a "first" position (depicted in FIG. 8) as well as a "second" position (as depicted in FIG. 9). To lock the farrier hoof stand 800 in a particular position, the pin fastener 700 is preferably inserted in to a co-planarly aligned stall jack orifice 330 and VRA orifice 125. In other words, the pin fastener 700 is demountably coupled to the VRA 120 and the second portion 300 (i.e. the stall jack). Here, the "first" position refers to the farrier hoof stand 800 in its most compact state (i.e. minimal height) where the post 320 is positioned adjacent to the plurality of buttresses 130. The "second" position refers to the farrier hoof stand 800 in an extended state where the post 320 is positioned distal to the plurality of buttresses 130 as opposed to adjacent thereto. In preferred embodiments, the anvil 310 is affixed to the post 320 via a fastener 900.

Although the disclosure has been explained in relation to its preferred embodiment, it is to be understood that many other possible modifications and variations can be made without departing from the spirit and scope of the disclosure.

What is claimed is:

1. A farrier hoof stand apparatus, comprising:
   a base;
   a vertical rise adjuster centrally and orthogonally affixed to the base;
   a plurality of buttresses each affixed to the base and the vertical rise adjuster;
   a stall jack;
   a cradle demountably positioned on the stall jack;
   a plurality of elongated tool holders;
   a pin fastener extending through the vertical rise adjuster and the stall jack;
   a plurality of magnets each peripherally affixed to the base;
   wherein
   the stall jack comprises an anvil, an orifice positioned on the anvil, and a post affixed to the anvil;
   the post of the stall jack is slidably positioned over the vertical rise adjuster opposite the base;
   the base is square and substantially planar;
   the plurality of elongated tool holders are each angularly affixed to the post of the stall jack opposite each other;
   the post of the stall jack is orthogonally coupled to the anvil.

2. The apparatus of claim 1, wherein the apparatus further comprises:
   a first position comprising the post of the stall jack positioned adjacent to the plurality of buttresses; and
   a second position comprising the post of the stall jack extending from the vertical rise adjuster thereby positioning the post of the stall jack distal to the plurality of buttresses.

3. The apparatus of claim 2, wherein
   the cradle comprises a cradle post; and
   the cradle post is demountably positioned within the cradle orifice.

4. The apparatus of claim 3, wherein
   the cradle comprises a U-shaped structure; and
   the cradle post is medianly positioned on the U-shaped structure.

5. The apparatus of claim 4, wherein the U-shaped structure comprises a first polymer coating.

6. The apparatus of claim 5, wherein
   each of the plurality of elongated tool holders is an oblong concaved structure; and
   the oblong concave structure comprises a vertex that extends towards the base.

7. The apparatus of claim 6, wherein each of the plurality of elongated tool holders comprises a second polymer coating.

8. The apparatus of claim 7, wherein at least one of the first polymer coating and the second polymer coating comprises an elastomer.

9. A farrier hoof stand apparatus, comprising:
   a base;
   a vertical rise adjuster centrally and orthogonally affixed to the base;

a plurality of buttresses each affixed to the base and the vertical rise adjuster;

a stall jack comprising an anvil, an orifice positioned on the anvil, and a post affixed to the anvil, the post of the stall jack being slidably positioned over the vertical rise adjuster opposite the base;

a cradle demountably positioned on the stall jack;

a plurality of elongated tool holders;

a pin fastener extending through the vertical rise adjuster and the stall jack;

a plurality of magnets each peripherally affixed to the base;

a first position comprising the post of the stall jack positioned adjacent to the plurality of buttresses;

a second position comprising the post of the stall jack extending from the vertical rise adjuster thereby positioning the post of the stall jack distal to the plurality of buttresses wherein the post of the stall jack is slidably positioned over the vertical rise adjuster;

the base is square and substantially planar;

the plurality of elongated tool holders are each angularly affixed to the post of the stall jack opposite each other; and the post of the stall jack is orthogonally coupled to the anvil.

10. The farrier hoof stand apparatus of claim 9, wherein the cradle comprises a cradle post; and the cradle post is demountably positioned within the cradle orifice.

11. The farrier hoof stand apparatus of claim 10, wherein the cradle comprises a U-shaped structure; and the cradle post is medianly positioned on the U-shaped structure.

12. The farrier hoof stand apparatus of claim 11, wherein the U-shaped structure comprises a first polymer coating.

13. The farrier hoof stand apparatus of claim 12, wherein each of the plurality of elongated tool holders is an oblong concaved structure; and the oblong concave structure comprises a vertex that extends towards the base.

14. The farrier hoof stand apparatus of claim 13, wherein each of the plurality of elongated tool holders comprises a second polymer coating.

15. The farrier hoof stand apparatus of claim 14, wherein at least one of the first polymer coating and the second polymer coating comprises an elastomer.

16. A farrier hoof stand apparatus, comprising:

a base;

a vertical rise adjuster centrally and orthogonally affixed to the base;

a plurality of buttresses each affixed to the base and the vertical rise adjuster;

a stall jack comprising an anvil, an orifice positioned on the anvil, and a post affixed to the anvil, the post of the stall jack being slidably positioned over the vertical rise adjuster opposite the base;

a cradle demountably positioned on the stall jack;

a plurality of elongated tool holders;

a pin fastener extending through the vertical rise adjuster and the stall jack;

a plurality of magnets each peripherally affixed to the base;

a first position comprising the post of the stall jack positioned adjacent to the plurality of buttresses;

a second position comprising the post of the stall jack extending from the vertical rise adjuster thereby positioning the post of the stall jack distal to the plurality of buttresses wherein the post of the stall jack is slidably positioned over the vertical rise adjuster;

the base is square and substantially planar;

the plurality of elongated tool holders are each angularly affixed to the post of the stall jack opposite each other;

the post of the stall jack is orthogonally coupled to the anvil;

the cradle comprises a U-shaped structure and a cradle post; and the cradle post is medianly positioned on the U-shaped structure.

17. The farrier hoof stand apparatus of claim 16, wherein the cradle comprises a cradle post; and the cradle post is demountably positioned within the cradle orifice.

18. The farrier hoof stand apparatus of claim 17, wherein the U-shaped structure comprises a first polymer coating.

19. The farrier hoof stand apparatus of claim 18, wherein each of the plurality of elongated tool holders is an oblong concaved structure; and the oblong concave structure comprises a vertex that extends towards the base.

20. The farrier hoof stand apparatus of claim 19, wherein each of the plurality of elongated tool holders comprises a second polymer coating; and at least one of the first polymer coating and the second polymer coating comprises an elastomer.

* * * * *